United States Patent
Grudzien

Patent Number: 5,965,821
Date of Patent: Oct. 12, 1999

[54] PRESSURE SENSOR

[75] Inventor: Christopher P. Grudzien, Mansfield, Mass.

[73] Assignee: MKS Instruments, Inc., Andover, Mass.

[21] Appl. No.: 08/887,579

[22] Filed: Jul. 3, 1997

[51] Int. Cl.⁶ .................................................. G01L 9/12
[52] U.S. Cl. ............................................. 73/724; 73/718
[58] Field of Search ................... 73/718, 724; 361/283.4

[56] References Cited

U.S. PATENT DOCUMENTS

| | | | |
|---|---|---|---|
| 3,318,153 | 5/1967 | Lode | 73/798 |
| 3,619,742 | 11/1971 | Rud, Jr. | 317/246 |
| 3,858,097 | 12/1974 | Polye | 73/724 X |
| 3,952,234 | 4/1976 | Birchall | 73/724 X |
| 4,084,438 | 4/1978 | Lee et al. | 73/706 |
| 4,136,603 | 1/1979 | Doyle, Jr. | 92/98 R |
| 4,168,518 | 9/1979 | Lee | 361/283 |
| 4,358,814 | 11/1982 | Lee et al. | 361/283 |
| 4,422,125 | 12/1983 | Antonazzi et al. | 73/718 X |
| 4,426,673 | 1/1984 | Bell et al. | 73/718 X |
| 4,434,203 | 2/1984 | Briefer | 428/152 |
| 4,495,820 | 1/1985 | Shimada et al. | 73/724 |
| 4,542,436 | 9/1985 | Carusillo | 73/718 X |
| 4,735,090 | 4/1988 | Jeffrey et al. | 73/706 |
| 4,774,626 | 9/1988 | Charboneau et al. | 361/283 |
| 4,785,669 | 11/1988 | Benson et al. | 73/718 |
| 4,823,603 | 4/1989 | Ferran et al. | 73/724 |
| 4,935,841 | 6/1990 | Jonsson et al. | 73/724 X |
| 4,977,480 | 12/1990 | Nishihara | 361/283 |
| 5,001,595 | 3/1991 | Dittrich et al. | 73/718 X |
| 5,005,421 | 4/1991 | Hegner et al. | 73/724 |
| 5,020,377 | 6/1991 | Park | 73/718 |
| 5,050,034 | 9/1991 | Hegner et al. | 73/718 X |
| 5,150,275 | 9/1992 | Lee et al. | 361/283 |
| 5,155,653 | 10/1992 | Kremidas | 361/283 |
| 5,349,492 | 9/1994 | Kimura et al. | 361/283.4 |
| 5,351,548 | 10/1994 | Briggs et al. | 73/718 |
| 5,400,489 | 3/1995 | Hegner et al. | 73/718 X |
| 5,442,962 | 8/1995 | Lee | 73/718 |
| 5,499,533 | 3/1996 | Miller et al. | 73/152 |
| 5,539,611 | 7/1996 | Hegner et al. | 361/283.4 |
| 5,561,247 | 10/1996 | Mutoh et al. | 73/724 |
| 5,571,970 | 11/1996 | Mutoh et al. | 73/724 |

FOREIGN PATENT DOCUMENTS

| | | | |
|---|---|---|---|
| 0 473 109 A2 | 4/1992 | European Pat. Off. | |
| 4136995 | 5/1993 | Germany | 73/718 |
| 56-162026 | 12/1981 | Japan | 73/724 |
| 1-16944 | 1/1989 | Japan | 73/718 |
| 5-172675 | 7/1993 | Japan | 73/718 |
| 2188155 | 9/1987 | United Kingdom | |

Primary Examiner—William Oen
Assistant Examiner—Robin Clark
Attorney, Agent, or Firm—Hale and Dorr LLP

[57] ABSTRACT

A pressure sensor has a housing for receiving a fluid whose pressure is being sensed, and an electrode assembly and a diaphragm arranged to form a variable capacitor within the housing. In one embodiment, the electrode assembly includes a dielectric disk with a conductive electrode and a standoff being formed on a surface of the disk facing the diaphragm. A spacer ring is provided between the standoff and the diaphragm so that the thickness of the spacer ring sets the gap between the electrode of the electrode assembly and the diaphragm. In another embodiment, the electrode assembly is an integral unit that includes a housing and an electrode such that lower surfaces of the housing and the electrode are coplanar to each other. In this embodiment, the spacer is between the housing and the diaphragm such that the thickness of the ring sets the length of the gap.

18 Claims, 3 Drawing Sheets

PRESSURE SENSOR

BACKGROUND OF THE INVENTION

This invention relates to pressure sensors for sensing the pressure of a fluid (liquid or gas) with a variable capacitor.

One known type of pressure sensor uses a variable capacitor to sense the pressure of a received fluid (liquid or gas). Such sensors, such as a BARATRON® Absolute Pressure Transmitters (BARATRON is a registered trademark of MKS Instruments, Inc. of Andover, Mass.), are often used in industrial applications, e.g., to measure the pressure of fluids in semiconductor processing equipment.

A known design for such a sensor has a housing that defines an interior chamber and an inlet for receiving a fluid whose pressure is to be sensed. First and second conductive electrodes are mounted in the housing, generally in parallel, and are spaced apart by a small gap to form a parallel plate capacitor. The first electrode is fixed relative to the housing, while the second electrode is movable relative to the first electrode in response to the received fluid. In one implementation, the first electrode is formed on a ceramic support disk with thick film deposition techniques, and the second electrode is a diaphragm, typically made of a metal, such as an alloy of nickel, chromium, and iron, sold under the name INCONEL® (a registered trademark of Inco Alloy International of Huntington, W. Va.).

The movable second electrode is typically clamped at its periphery and extends across the width of the sensor to define first and second chambers within the interior. The first chamber has a reference inlet by which a known reference pressure can be established, e.g., zero pressure. The second chamber has an inlet for receiving the fluid to be sensed, causing a central portion of the diaphragm to flex in response to changes in the pressure of the fluid. This flexing movement causes the gap between the electrodes to change. An electrical signal is provided to the first electrode (the movable second electrode is typically grounded) so that the change in capacitance between the first and second electrodes can be sensed and related to the pressure of the received fluid.

For the pressure to be sensed meaningfully and in a way that can be accurately resolved, the diaphragm must be large enough so that it can flex sufficiently so that the change in the gap, and hence the change in capacitance, can be sensed with sufficient resolution. As the diaphragm is made smaller and smaller, the gap between the electrodes must be made smaller. In mathematical terms, it is well known that $C=eA/d$ for a parallel plate capacitor, where C is the capacitance, e is a constant based on the material between the plates (e=1 for a vacuum), A is the common area of the plates, and d is the gap. This means that the change in capacitance with respect to a change in the gap, $dC/dd=-eAd^{-2}$. As this equation indicates, the smaller A is, the harder it is to accurately detect changes in dC/dd. Consequently, with a small common area, there must be a very small gap to permit accurate sensing. In that case, however, it is very important to control the gap in an accurate and repeatable manner, but such control is difficult with a small gap.

Accordingly, while it would be desirable to be able to make such sensors smaller in order to reduce space and costs, it can be difficult to control the gap in an accurate and repeatable manner.

SUMMARY OF THE INVENTION

The present invention includes a pressure sensor with a variable capacitor that is configured so that a spacer can be provided to accurately control the gap between electrodes in the variable capacitor.

A pressure sensor of the present invention receives a fluid and measures its pressure. The sensor has an electrode assembly with at least a first electrode, and a diaphragm serving as a second electrode. The diaphragm is oriented in parallel relative to, and spaced from, the first electrode to define a gap. The diaphragm is movable relative to the first electrode such that the gap between the electrode and the diaphragm changes in response to changes in the pressure of the received fluid. A spacer is disposed between and in contact with the electrode assembly and the diaphragm, such that the thickness of the spacer sets the distance of the gap.

In one embodiment, the electrode assembly has a dielectric support and the first electrode is formed on a surface of the support. Also formed on the support (preferably formed at the same time and with the same materials as the electrode) is a standoff that has the same thickness as the first electrode. A spacer is provided in contact with the standoff so that the thickness of the spacer sets the gap, and thus the gap is substantially independent of the thickness of the first electrode.

In another embodiment, the electrode assembly is an integral unit that includes the first electrode and a housing, the first electrode and the housing having coplanar surfaces that face the diaphragm. A spacer contacts the housing and the diaphragm, and its thickness thus determines the thickness of the gap.

The invention also includes a method of making a sensor including steps of disposing a spacer between a diaphragm and one of the electrode assemblies referred to above. In the case of an electrode assembly with a dielectric support, the method includes forming an electrode and a standoff at the same time and with the same materials on the surface of the dielectric support. This method is preferably by deposition, in which case one mask has openings for both the electrodes and the standoff.

According to the present invention, a capacitive pressure sensor can be made that is less than 1 inch (2.5 cm) in diameter and 3 inches (7.5 cm) long and can measure pressure in ranges of 50 to 3,000 psia/psig/psis. The sensor is easy to manufacture, has barometric pressure immunity, and can be made at low cost. Other features and advantages will become apparent from the following detailed description, drawings, and claims.

DETAILED DESCRIPTION

Figure 1:
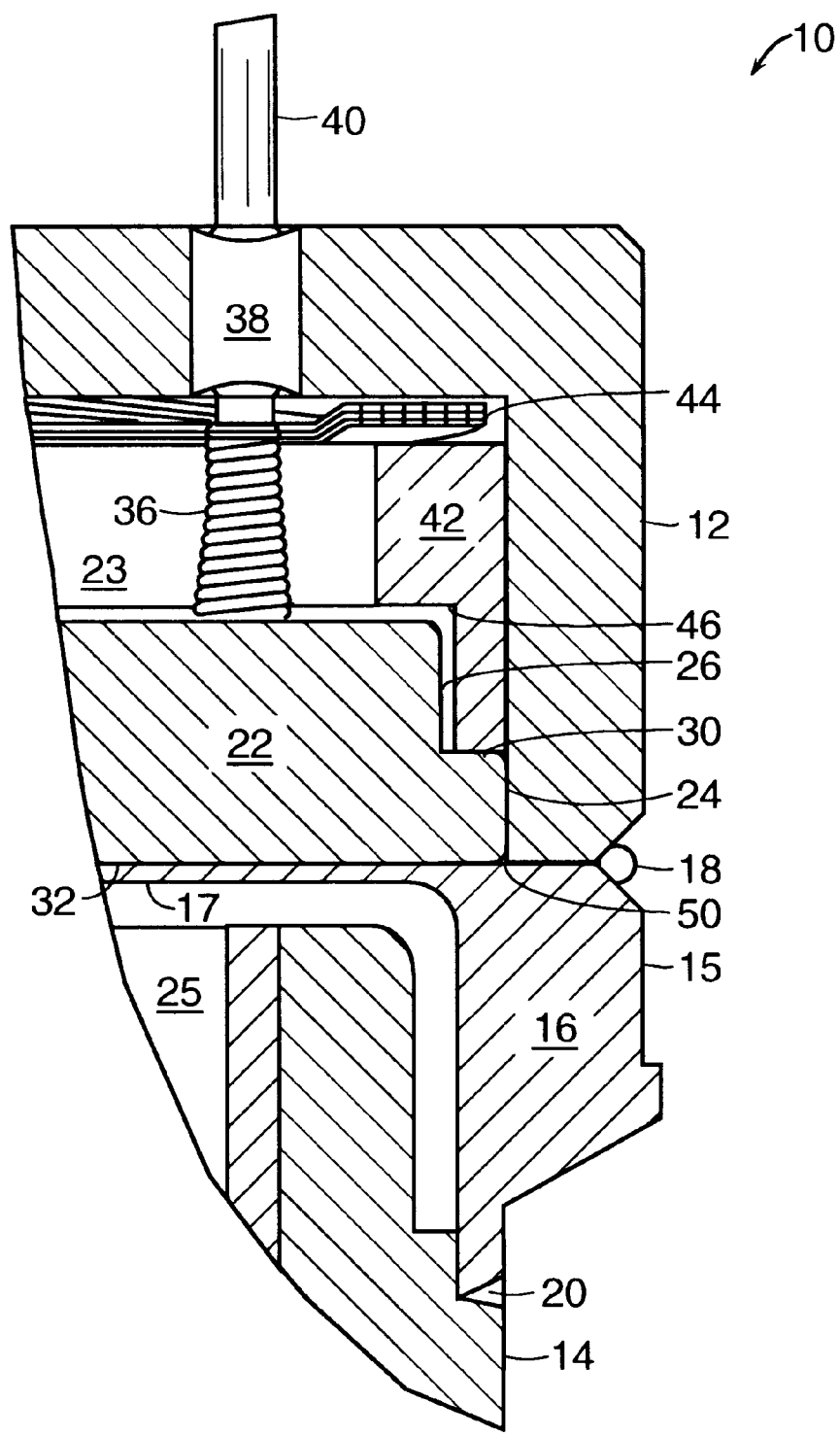
FIG. 1 is a cross-sectional view of a portion of a pressure sensor according to the present invention.

Referring to FIG. 1, a capacitive pressure sensor 10 according to one embodiment of the present invention receives a fluid (liquid or gas) whose pressure is being sensed. Sensor 10 has a housing that includes an upper cover 12, a lower cover 14, and an inverted cup-shaped diaphragm 16 between covers 12, 14. Covers 12, 14 and a sidewall portion 15 of diaphragm 16 are welded together with welds 18, 20 to create a housing. Diaphragm 16 has a first portion 17, preferably circular, that extends along a first plane that typically is flat and perpendicular to the direction along which the fluid is received by sensor 10.

Diaphragm 16 defines two chambers in the housing, a reference pressure chamber 23 and an unknown pressure chamber 25 with an unknown pressure of the fluid to be sensed, on opposite sides of diaphragm 16. As is generally known, an inlet to reference chamber 23 allows a reference pressure to be set; while an inlet to unknown pressure chamber 25 is used for receiving the fluid whose pressure is being sensed.

Sensor 10 also has an electrode assembly 22 that is fixed relative to the housing and is preferably formed or a circular dielectric disk, preferably made of a ceramic such as alumina. The disk has a larger diameter portion 24 and a small diameter portion 26 that together define an annular step with a shoulder 30. Larger diameter portion 24 has a surface 32 that faces diaphragm 16.

Figure 2:
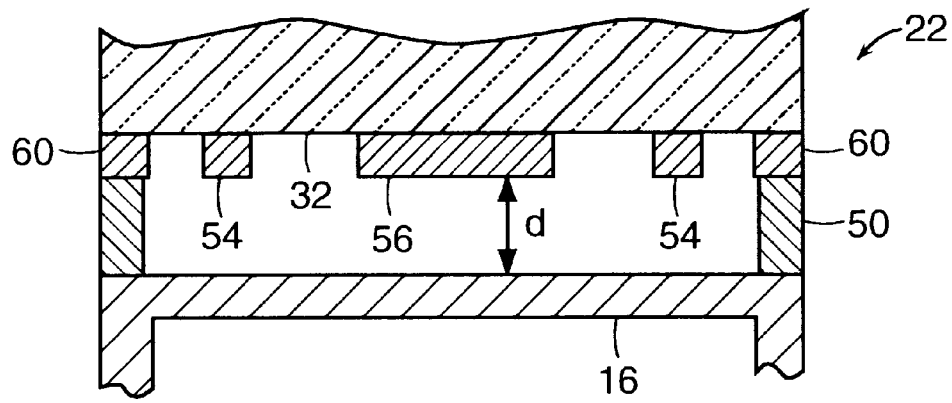
FIGS. 2 and 3 are a cross-sectional view and a plan view of the electrodes in the sensor of FIG. 1 in more detail.
Figure 3:
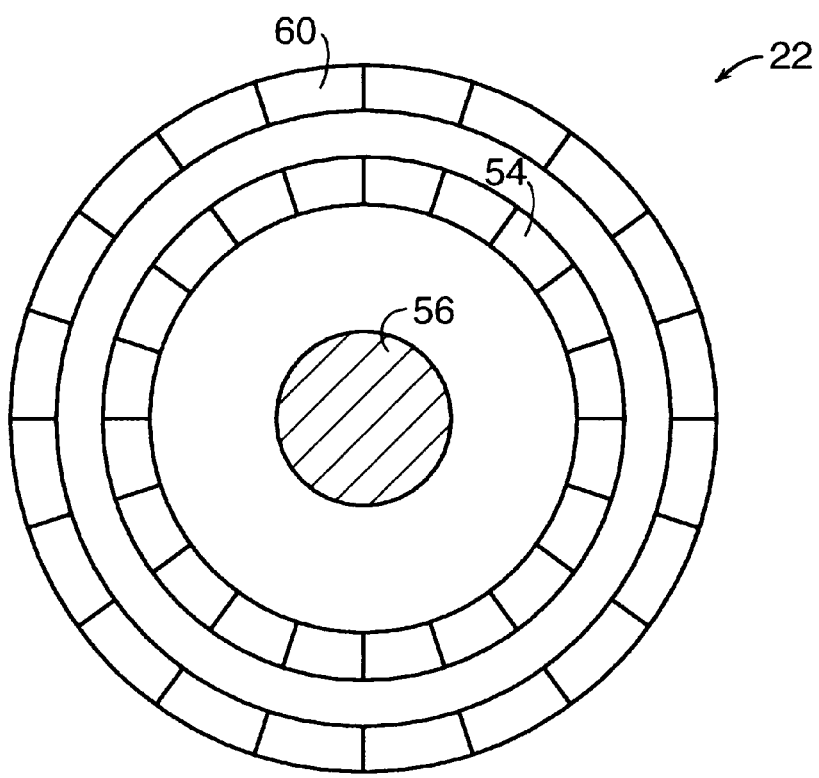

Referring also to FIGS. 2 and 3, two conductive electrodes, an outer electrode 54 and an inner electrode 56, preferably formed with thick film techniques (such as deposition through a silk screen or a mask) are formed on surface 32. Electrodes 54, 56 and electrode portion 17 of diaphragm 16 are oriented in parallel to define two variable capacitors with a nominal gap having a size d.

Electrode assembly 22 has openings (not shown) through which metal contacts, such as plated through holes, extend to contact electrodes 54, 56, and thus to couple these electrodes to circuitry (not shown) that provides a signal used to sense capacitance. Such circuitry is generally well known in the field of capacitive pressure sensing. These contacts are electrically coupled to conductive spring 36 and then to conductive pin 40, which extend through dielectric preform 38 that extends through cover 12 and couples the electrodes to the circuitry. While only one spring 36, pin 40, and preform 38 are shown, typically there are a number of each of these components.

Electrode assembly 22 is biased downwardly toward diaphragm 16 with an annular hold down ring 42 and a wave washer 44 that is between cover 12 and ring 42. Annular hold down ring 42 has a step 46 in its inner diameter sized to generally conform (with sufficient clearance) to the step of electrode assembly 22. This sensor does not need a large clamping force, and unlike some other sensors of this general type, there is no need for a step in the housing to conform with the step in the disk.

Between diaphragm 16 and electrode assembly 22 is a spacer 50 that is preferably annular with an outer diameter roughly equal to the outer diameter of electrode assembly 22 (note that spacer 50 is barely visible in FIG. 1, which is drawn to scale, but is much more visible in FIG. 2, which is not drawn to scale). Spacer 50 should be made of a material that can be made into a ring or some other substantially flat shape with a high precision thickness, defined here as being less than ±5% of its desired thickness, with a desired thickness of less than 75 microns (3 mils.)

Referring particularly to FIG. 2, electrodes 54, 56 both have a thickness typically of about 12.5 microns (0.5 mils), while spacer 50 is typically about 75 microns (3 mils) thick or less and is preferably made from a low expansion alloy, such as invar or some other nickel-iron alloy. Spacer 50 could be made of other metals, such as stainless steel, or it could be a nonmetal or a dielectric material, such as glass or ceramic. Whatever the material, the spacer should be made of a material that can be fabricated with a high precision thickness at the small thicknesses as noted above.

To further ensure that the gap d between electrodes 54, 56 and diaphragm 16 has a predictable thickness, a standoff ring 60 is formed on electrode assembly 22 at its outer periphery and is preferably formed at the same time as electrodes 54, 56, for example, by using the same production techniques and the same materials using one mask or one silk screen with openings for both the standoff and the electrodes. With thick film techniques, there can be variations in the thickness of the electrodes from one device to the next, although there will be virtually no variation in thickness between the electrodes and the standoff ring when they are formed at the same time. Further equalization in flatness can be accomplished by various abrasive techniques, such as lapping, on electrodes 54, 56 and standoff ring 60. These abrasive techniques also help insure that the lower surfaces of electrodes 54, 56 and standoff ring 60 are planar and flat.

This equal thickness between the electrodes and standoff ring means that nominal gap d between diaphragm 16 and electrodes 54, 56 will depend virtually entirely on the thickness of spacer 50, and substantially not at all on the thickness of electrodes 54, 56 from one device to the next, and preferably will not depend on any shape, size, or other geometry of electrodes 54, 56 or the diaphragm. Standoff ring 60 and electrodes 54, 56 are electrically insulated from each other, typically with an air gap, to prevent shorting from electrodes 54, 56 to the diaphragm when the spacer is also conductive.

With a structure such as this, because the nominal gap between electrodes can be made small and can still be carefully controlled, an accurate pressure sensor can be made with a diaphragm that is smaller than those typically used in comparable applications. Indeed, the diameter of the sensor can be made smaller than 1 inch (2.5 cm), and the length less than 3 inches (7.5 cm), where the diameter is the dimension in the plane parallel to the electrodes that make up the capacitor, and the length is the dimension perpendicular to that plane. Among other similar known devices, the minimum diameter is about 1.5 inches (3.8 cm).

Figure 4:
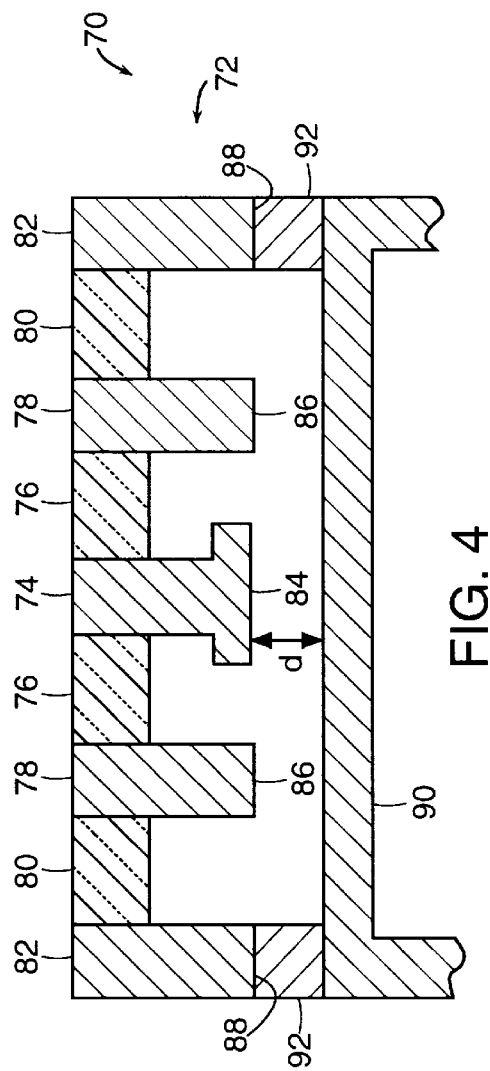
FIGS. 4 and 5 are cross-sectional view of sensors according to other embodiments of the present invention.

Another embodiment of the present invention is shown in FIG. 4. In a sensor 70, the disk, electrodes on the surface of the disk, upper cover, hold down ring, wave washer, and contact spring shown in FIG. 1 are all replaced with an integral and unitary electrode assembly 72. Electrode assembly 72 is shown here as a cylindrical structure that has a first conductive electrode 74 with an inverted T-shaped cross-section, a dielectric ring 76 around the upper part of first electrode 74 (thereby surrounding a portion of the post portion of the T-shaped first electrode), a second conductive electrode 78 surrounding first dielectric ring 76, a second dielectric ring 80 surrounding second electrode 78, and an outer ring 82 that serves as a housing member.

First electrode 74, a second electrode 78, and outer ring 82 have respective lower surfaces 84, 86, and 88 that are coplanar to each other. Upper surfaces of these components may, but need not, be coplanar, and lower surfaces of dielectric rings 76, 80 could be coplanar with surfaces 84, 86, and 88. Coplanar surfaces 84, 86, and 88 are positioned near a diaphragm 90. A spacer ring 92 is provided around an outer periphery of diaphragm 90 to be in contact with outer ring 82. As in the embodiment of FIG. 1, spacer ring 92 should be made of a material that can be formed with a small thickness, and with high precision relative to its thickness. Outer ring 82, spacer ring 92, and diaphragm 90 are welded or otherwise bonded together to produce the variable capacitor structure. As in the embodiment of FIG. 1, a nominal gap between electrodes 74, 78 and diaphragm 90 can be determined solely by the thickness of spacer ring 92 and can thus be determined accurately and repeatedly.

Figure 5:
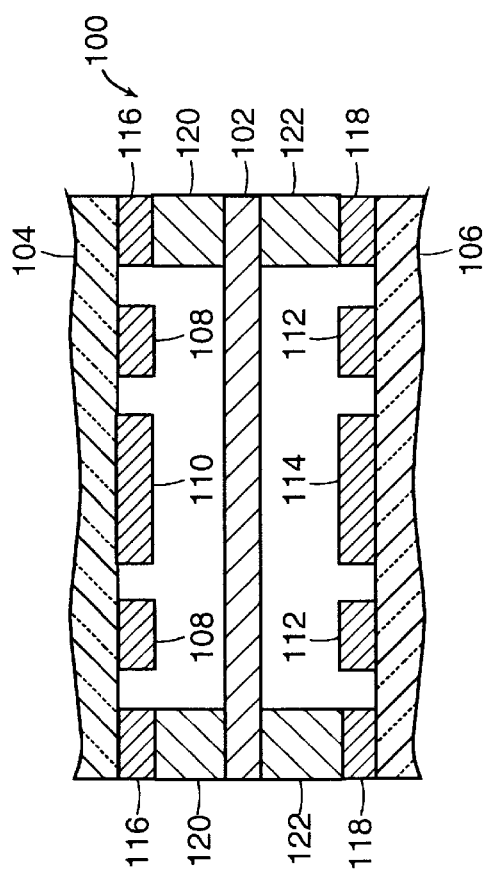

Either of the embodiments of FIGS. 1 and 4 could be formed with a differential capacitor structure. FIG. 5 illustrates a device 100 similar to that of FIG. 1, but in which a diaphragm 102 is between two dielectric disks 104, 106 with conductive electrode 108, 110, 112, and 114 formed thereon and facing diaphragm 102. Device 100 has two standoff rings 116, 118 and two spacers 120, 122.

Having described embodiments of the present invention, it should be apparent that modifications can be made without departing from the scope of the invention as defined by the appended claims. For example, rather than a dual electrode on a ceramic disk for the electrode assembly, a single electrode could be used and could be formed on some other material. While the electrodes are preferably formed on a disk with thick film techniques, thin film techniques, such as sputtering, could also be used to form the electrodes. While two electrodes are preferred, other numbers of electrodes could be used. The electrode assembly in FIG. 4 is described as cylindrical, but it can take some other shape. While the standoff and spacer are both described as being rings, the sensor need not have a circular cross-section; furthermore, the standoff and spacer need not be in complete contact—for example, the spacer could be a ring, while the standoff could be formed in a number of disconnected sector pieces but with sufficient contact to space apart the electrodes that form the capacitor.

What is claimed is:

1. A pressure sensor for sensing the pressure of a fluid, the pressure sensor comprising:
    a housing for receiving the fluid whose pressure is being sensed;
    an electrode assembly mounted in the housing, the electrode assembly including a conductor;
    a conductive diaphragm spaced from the conductor in the electrode assembly to define a capacitor having a gap between the conductor and the diaphragm, the diaphragm being mounted in the housing to be movable relative to the electrode assembly such that the size of the gap changes in response to changes in the pressure of the received fluid; and
    a spacer having a thickness and being disposed between, and in contact with, the electrode assembly and the diaphragm such that the thickness of the spacer determines the size of the gap;
    wherein the electrode assembly has at least one conductor near the diaphragm and an outer housing, the electrode assembly being formed as an integral single unit such that the outer housing and the conductor each have respective lower surfaces that are coplanar to each other, the spacer being between the diaphragm and the outer housing so that the gap between the electrode and the diaphragm is defined by the thickness of the spacer.

2. The pressure sensor of claim 1, further comprising a second conductor electrically insulated from the first conductor and the outer housing and integrally formed in the single unit, the second conductor having a surface that is coplanar with the surface of the first conductor and the outer housing.

3. The pressure sensor of claim 2, wherein the first conductor is formed at the center of the unit and is surrounded by a first dielectric ring, the second electrode surrounds the first dielectric ring, a second dielectric ring surrounds the second conductor, and the outer housing surrounds the second dielectric ring.

4. The pressure sensor of claim 3, wherein at least one of the dielectric rings is formed of glass and the conductors are made of metal.

5. A pressure sensor comprising:
    a first conductor and a housing electrically insulated from each other and integrally formed together into a single unit, the first conductor and the housing each having a lower surface, the respective lower surfaces being coplanar;
    a diaphragm oriented in parallel to and spaced from the first conductor by a gap so that the diaphragm and the first conductor form a variable capacitor, the diaphragm being movable to change the size of the gap; and
    a spacer between the lower surface of the housing and the diaphragm, a thickness of the spacer defining a nominal gap between the conductor and the diaphragm.

6. The pressure sensor of claim 5, further comprising a second electrode having a lower surface that is coplanar with the lower surfaces of the electrode and the housing.

7. The pressure sensor of claim 6, further comprising a first dielectric member between the first and second electrodes to keep the first and second electrodes electrically insulated from each other, and a second dielectric member between the second electrode and the housing to keep the second electrode and the housing electrically insulated from each other.

8. A pressure sensor comprising:
    an electrode assembly including a first conductor, a second conductor, a first dielectric member, a second dielectric member, and an outer housing, a lower surface of the first conductor being substantially coplanar with a lower surface of the second conductor and with a lower surface of the outer housing, the first dielectric member being disposed between the first and second conductors and electrically insulating the first conductor from the second conductor, the second dielectric member being disposed between the second conductor and the outer housing;
    a flexible conductive diaphragm, the diaphragm and the first conductor forming a capacitor, a capacitance of the capacitor being dependent upon a spacing between the diaphragm and the first conductor;
    a spacer disposed between the lower surface of the outer housing and the diaphragm.

9. A pressure sensor according to claim 8, wherein the outer housing is conductive, and wherein the second dielectric member electrically insulates the second conductor from the outer housing.

10. A pressure sensor according to claim 9, wherein the outer housing, the first conductor, and the second conductor are all formed from substantially the same conductive material.

11. A pressure sensor comprising:
    an electrode assembly including an outer housing, a first dielectric member, and a first conductor, the outer housing defining an aperture, at least a portion of the first dielectric member being disposed in the aperture defined by the outer housing, the first dielectric member defining an aperture, at least a portion of the first conductor being disposed in the aperture defined by the first dielectric member, a lower surface of the outer housing being substantially coplanar with a lower surface of the first conductor;
    a flexible conductive diaphragm, the diaphragm and the first conductor forming a capacitor, a capacitance of the capacitor being dependent upon a spacing between the diaphragm and the first conductor;
    a spacer disposed between the lower surface of the outer housing and the diaphragm.

12. A pressure sensor according to claim 11, further including a second conductor and a second dielectric member, at least a portion of the second dielectric member being disposed in the aperture defined by the outer housing, the second dielectric member defining an aperture, at least a portion of the second conductor being disposed in the aperture defined by the second dielectric member, a lower surface of the second conductor being substantially coplanar with the lower surface of the first conductor.

13. A pressure sensor according to claim 12, wherein the first dielectric member is annular.

14. A pressure sensor according to claim 13, wherein the second dielectric member is annular.

15. A pressure sensor according to claim 14, wherein at least a portion of the first dielectric member is disposed in the aperture defined by the second dielectric member.

16. A pressure sensor according to claim 11, wherein the first dielectric member is annular.

17. A pressure sensor according to claim 11, wherein a top surface of the outer housing is substantially coplanar with a top surface of the first dielectric member.

18. A pressure sensor according to claim 17, wherein the top surface of the outer housing is substantially coplanar with a top surface of the first conductor.

* * * * *